United States Patent

Habbu et al.

(10) Patent No.: US 9,349,069 B2
(45) Date of Patent: May 24, 2016

(54) DYNAMIC LINE-DETECTION SYSTEM FOR PROCESSORS HAVING LIMITED INTERNAL MEMORY

(75) Inventors: Raghavendra Habbu, Bangalore (IN); Akshayakumar Haribhatt, Bangalore (IN); Rajesh Vijayakumar, Bangalore (IN); Rajesh Mahapatra, Bangalore (IN); Gopal Karanam, Bangalore (IN)

(73) Assignee: Analog Devices, Inc., Norwood, MA (US)

( * ) Notice: Subject to any disclaimer, the term of this patent is extended or adjusted under 35 U.S.C. 154(b) by 611 days.

(21) Appl. No.: 13/300,993

(22) Filed: Nov. 21, 2011

(65) Prior Publication Data

US 2013/0128045 A1    May 23, 2013

(51) Int. Cl.
  *G06K 9/46* (2006.01)
  *G06K 9/00* (2006.01)

(52) U.S. Cl.
  CPC .......... *G06K 9/4633* (2013.01); *G06K 9/00798* (2013.01); *G06K 9/00973* (2013.01)

(58) Field of Classification Search
  CPC ....................................................... H04N 7/18
  USPC ........................................................ 348/148
  See application file for complete search history.

(56) References Cited

U.S. PATENT DOCUMENTS

| | | | |
|---|---|---|---|
| 5,365,600 A | 11/1994 | Nagaishi | |
| 5,832,138 A * | 11/1998 | Nakanishi et al. | 382/281 |
| 6,005,984 A | 12/1999 | Kawakami et al. | |
| 6,111,993 A * | 8/2000 | Matsunaga | 382/281 |
| 6,292,583 B1 | 9/2001 | Maruo | |
| 6,603,870 B1 * | 8/2003 | Bascle | 382/132 |
| 7,200,282 B2 | 4/2007 | Xu | |
| 7,307,545 B2 * | 12/2007 | Nishida | 340/901 |
| 7,437,006 B2 * | 10/2008 | Bascle et al. | 382/228 |
| 7,538,821 B2 * | 5/2009 | Ahn et al. | 348/558 |
| 7,738,730 B2 | 6/2010 | Hawley | |
| 7,881,531 B2 * | 2/2011 | Bascle et al. | 382/180 |
| 8,159,537 B2 * | 4/2012 | Itoh et al. | 348/155 |
| 8,477,999 B2 * | 7/2013 | Nishida et al. | 382/104 |
| 2002/0107674 A1 * | 8/2002 | Bascle et al. | 703/1 |
| 2003/0123736 A1 | 7/2003 | Xu | |
| 2004/0081359 A1 * | 4/2004 | Bascle et al. | 382/181 |
| 2006/0239509 A1 | 10/2006 | Saito | |
| 2008/0158361 A1 * | 7/2008 | Itoh et al. | 348/155 |
| 2009/0010482 A1 * | 1/2009 | Nishida et al. | 382/100 |
| 2009/0148046 A1 * | 6/2009 | Bascle et al. | 382/190 |
| 2009/0167864 A1 * | 7/2009 | Unoura | 348/148 |
| 2009/0169130 A1 | 7/2009 | Li et al. | |
| 2009/0245687 A1 | 10/2009 | Jeon et al. | |
| 2010/0098295 A1 * | 4/2010 | Zhang et al. | 382/103 |

OTHER PUBLICATIONS

International Search Report and Written Opinion for Internation Application No. PCT/US2012/065455, issued on Mar. 7, 2013 and mailed Mar. 15, 2013.

(Continued)

*Primary Examiner* — Kehinde O Abimbola
(74) *Attorney, Agent, or Firm* — Patent Capital Group (57) ABSTRACT

A line-detection system computes, using a local memory, a result of a partial conversion of image-space pixel data from image space to Hough space. The result is analyzed for edges corresponding to a line present in the partial conversion. The line is compared against other lines detected in previously computed partial results to identify a longest line in the image.

23 Claims, 5 Drawing Sheets

(56) References Cited

OTHER PUBLICATIONS

Muhammad U K Khan et al. "A Swift and Memory Efficient Hough Transform for Systems and Limited Fast Memory", Jul. 6, 2009, Image Analysis and Recognition, Springer Berlin Heidelberg, Berlin, Heidelberg, pp. 297-306, XP019122391, ISBN: 978-3-642-02610-2, Section 4.3, Section 2 to 4; figure 3.

Radovan Josth et al. "Real-Time Line Detection Using Accelerated High-Resolution Hough Transform" In: "Field Programmable Logic and Application", May 2011, Springer Berlin Heidelberg, Berlin, Heidelberg, XP55055441, ISSN: 0302-9743, ISBN: 978-3-54-045234-8 vol. 6688, pp. 784-793, DOI: 10.1007/978-3-642-21227-7_73, Section 2.1.

Shinichi Hirai et al. "FPGA-Based REaltime Vision System", Journal of Robotics and Mechatronics, vol. 17, No. 4, May 18, 2005, XP55055491, Section 3.3.

Satzoda R K et al. "Parallelizing the Hough Transform Computation", IEEE Signal Processing Letters, IEEE Service Center, Piscataway, NJ, US vol. 15, Jan. 1, 2008, pp. 297-300, XP011204833, ISSN: 1070-9908.

\* cited by examiner

| θ | | | | | | 10 | | | | | |
|---|---|---|---|---|---|---|---|---|---|---|---|
| ρ value | 0 | 1 | 2 | 3 | 4 | 5 | 6 | 7 | 8 | 9 | 10 |
| ρ-value votes | 2 | 11 | 15 | 35 | 32 | 34 | 12 | 8 | 14 | 7 | 3 |

402 (above column 3); 404 (above column 5)

| θ | | | | | | 20 | | | | | |
|---|---|---|---|---|---|---|---|---|---|---|---|
| ρ value | 0 | 1 | 2 | 3 | 4 | 5 | 6 | 7 | 8 | 9 | 10 |
| ρ-value votes | 1 | 5 | 20 | 29 | 19 | 7 | 6 | 21 | 58 | 21 | 6 |

408 (above column 3); 410 (above column 8)

| Detected Line | θ | ρ | ρ-value votes |
|---|---|---|---|
| 1 | 10 | 3 | 35 |
| 2 | 20 | 8 | 58 |

… 
DYNAMIC LINE-DETECTION SYSTEM FOR PROCESSORS HAVING LIMITED INTERNAL MEMORY

TECHNICAL FIELD

Embodiments of the invention generally relate to image processing and, in particular, to detecting lines in images.

BACKGROUND

Computer-based image-processing and image-analysis techniques may be used to detect shapes (e.g., lines, circles, or ellipses) in digitized images. Images from vehicle-mounted cameras, for example, may be analyzed for lines and other content therein; particular applications in this field include driver-assistance systems that recognize lane markers on a road by identifying them as lines. These systems may then determine where in a lane the driven vehicle is located and, for example, warn the driver of the vehicle if it drifts too close to a lane boundary. A fast and robust line-detection method, capable of accurate real-time analysis, is required for such systems. One such method uses a technique known as a Hough transform that, among other advantages, is capable of detecting lines in noisy images and in images having variations in brightness.

The image captured from the vehicle-mounted camera is first pre-processed to identify edges in the image (using, for example, a Sobel or Prewitt operator), thereby creating an "edge image." The Hough transform is then used to determine which edges in the edge image are lines by first converting the data in the image from "image space" to "Hough space." Image space refers to the expression of the usual (x,y) coordinate data in an image, in which a line may be expressed using equation (1), as shown below.

$$y = mx + b \qquad (1)$$

In equation (1), m is the slope of the line and b is the position the line intercepts the y-axis. In Hough space, this same line is expressed using a first parameter $\rho$, which is the shortest distance between the line and the origin, and a second parameter $\theta$, which is the angle this shortest line makes with the x-axis. In general, lines in Hough space may be expressed using the relationship shown below in equation (2).

$$\rho = x \cos \theta + y \sin \theta \qquad (2)$$

Notably, a line in image space reduces to a single point in Hough space of coordinate $(\rho,\theta)$, while non-linear shapes in image space produce curves or other non-point shapes in Hough space.

In theory, then, the converted Hough-space data may simply be searched for single points, the locations of which reveal which edges in image space correspond to lines. In practice, the Hough transform converts and searches the (x,y) edge-pixel data by calculating a number of $\rho$ values for a predetermined set of $\theta$ values, using equation (2), for each (x,y) edge pixel. A two-dimensional array of size $\rho \times \theta$ (an "accumulator array") is maintained; each cell in the array accumulates a running tally, or "votes," of the number of times a particular $(\rho,\theta)$ pair has been calculated (and rounded up or down to the cell in the array having the nearest value). Because a group of (x,y) edge pixels belonging to a straight line produces the same $(\rho,\theta)$ pair more often than a group of (x,y) edge pixels that do not correspond to a straight line, higher vote counts in the two-dimensional accumulator array denote $(\rho,\theta)$ pairs corresponding to lines. The votes in the two-dimensional accumulator array may thus be searched for local maxima, which correspond to lines in the (x,y) space of the original image.

Figure 1A:
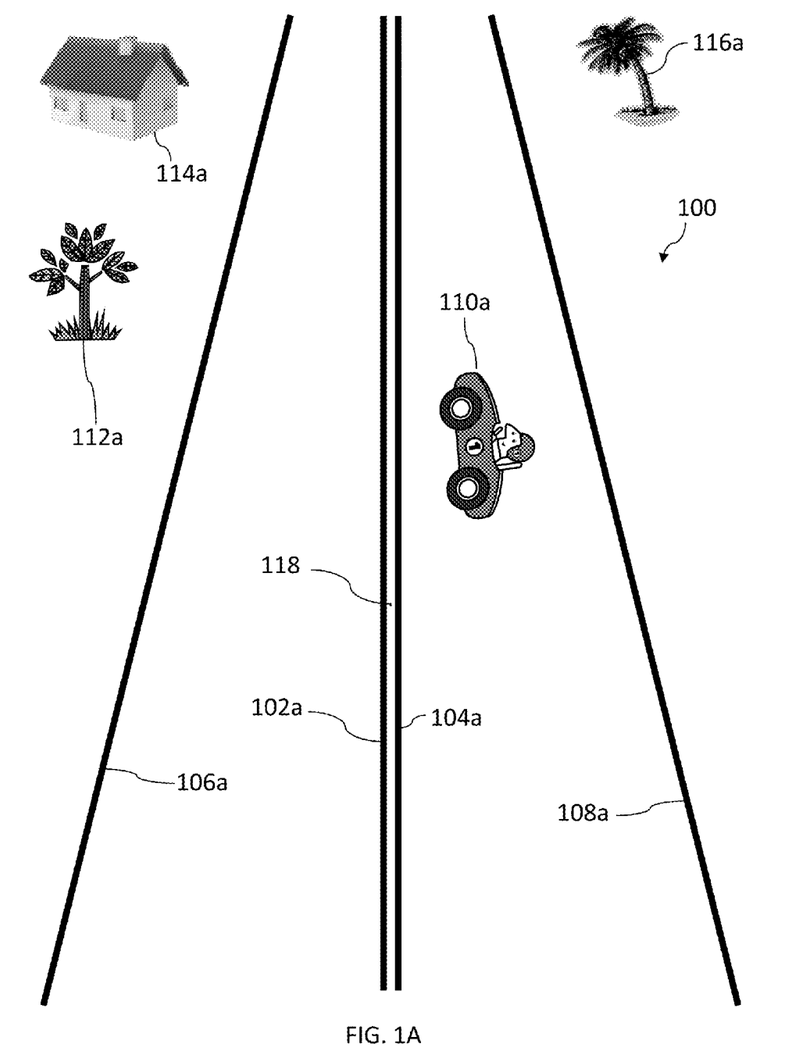
FIGS. 1A and 1B depict a roadway scene and its Hough-space transform, respectively.
Figure 1B:
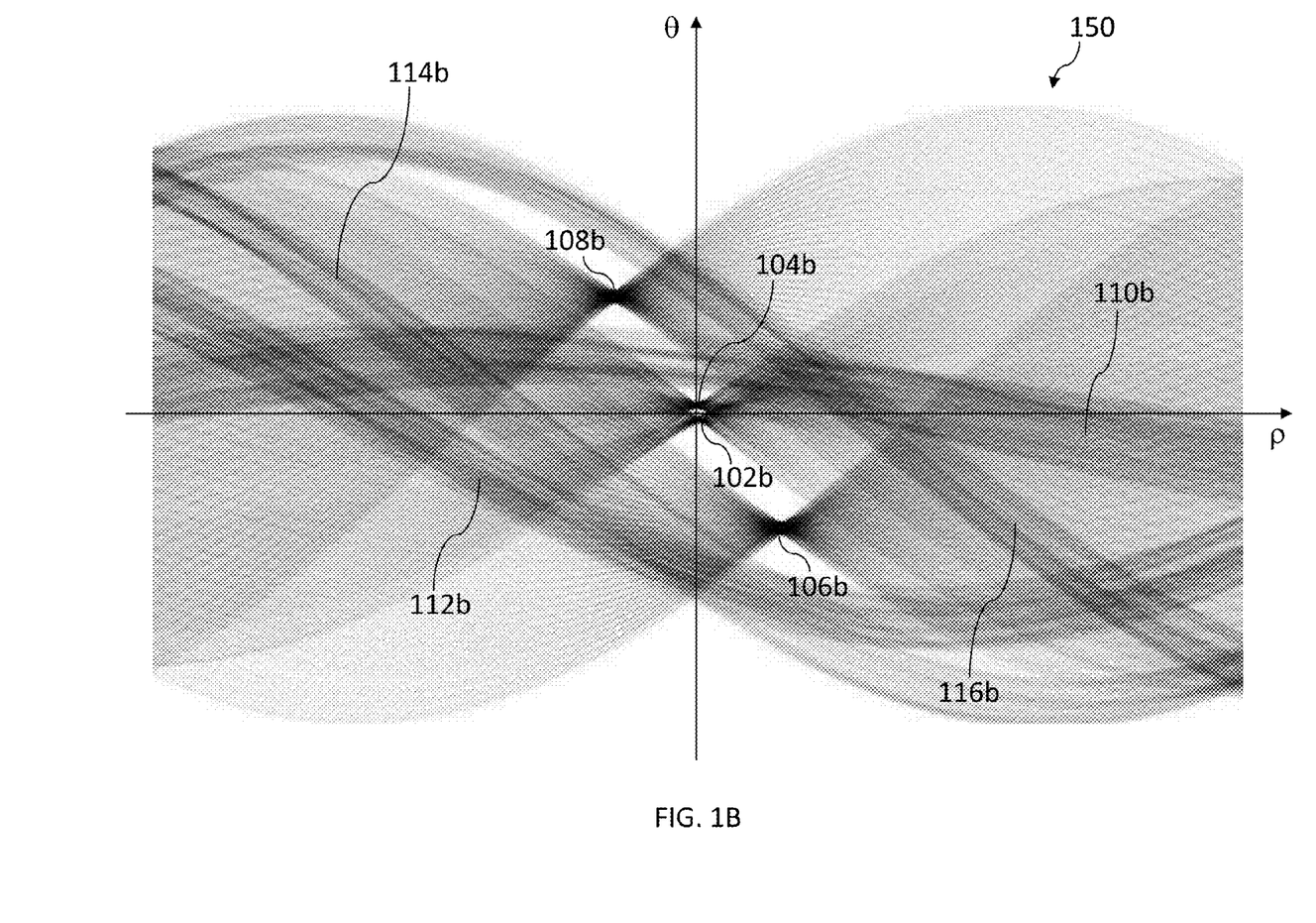

An example may further illustrate the relationship between image space and Hough space. A simplified representation of a roadway 100 and its corresponding Hough transform 200 are shown in FIGS. 1A and 1B, respectively. The roadway scene 100 includes center lane markers 102a, 104a and boundary lane markers 106a, 108a as well as a car 110a in one lane and other objects 112a, 114a, 116a outside the lanes. A (0,0) origin 118 in the (x,y) image space shown in the roadway scene 100 is disposed in the approximate center of the scene 100. As explained above, lines in image space reduce to points in Hough space; in the Hough space 150 depicted in FIG. 1B, the lines 102a, 104a, 106a, 108a correspond to points 102b, 104b, 106b, 108b (note that, however, artifacts in the conversion procedure used to produce FIG. 1B produce noise around the points 102b, 104b, 106b, 108b). Because the center lane markers 102a, 104a lie close to the origin 118, their $\rho$ values (i.e., the shortest distances between the lines 102a, 104a and the origin 118) are small, as reflected by their corresponding points 102b, 104b in the Hough space 150. Because the points 102a, 104a lie on opposite sides of the origin 118, their $\theta$ values are approximately equal and opposite, as again reflected in the Hough space 150. The boundary lane markers 106a, 108a, being farther from the origin 118, have greater $\rho$ values, as shown. The other objects 110a, 112a, 114a, 116a in the roadway scene 100 are composed of many curved lines and other shapes and thus transform into bands 110b, 112b, 114b, 116b of $(\rho,\theta)$ pairs.

A computer processor that implements the Hough transform stores the edge image in memory and may require access to any part of the edge image at any time, depending on where the edges are located in it. In addition, existing systems and methods require a large, two-dimensional accumulator array to tally the votes for the $\rho$ and $\theta$ values; both of these requirements depend on fast memory. Typically, memory in a computer system is arranged hierarchically, with relatively small and fast (but expensive) memory located near the processor and relatively large and slow (but cheap) memory located further from the processor. Note that, in this application, the term "local memory" is used to refer to the fast memory, but this term is not meant to be limiting and may apply to any kind of register file, cache, L1 or L2 memory, or any other type of memory closer in hierarchy to the processor than the large, slow memory (herein referred to as "main" or "system" memory).

The large sizes of the two-dimensional accumulator array and edge image, as well as the Hough transform's unpredictable "random" access to them, not only means that they cannot fit in local memory but also that portions of the accumulator array and edge image cannot be efficiently cached; unless the local memory or cache is large enough to store the entire edge image and accumulator array, the Hough transform will run very slowly as it makes repeated, random accesses to a remote main memory. Modern desktop-computer processors may have large enough local memories to run the Hough transform well, but low-power mobile or digital-signal processors, such as the ones used in vehicle-based image-detection systems, do not. The problem only becomes worse with the ongoing development of low-cost, high-resolution digital cameras that create digital images of ever-increasing size. A need therefore exists for an efficient line-detection system capable of running quickly on a processor having limited local memory.

SUMMARY OF THE INVENTION

Embodiments of the present invention include a system and method for detecting lines in an image by dynamically using a limited local memory space. Using a Hough transform, the Hough-space $(\rho,\theta)$ data generated from the image-space (x,y) edge data is analyzed on-the-fly (using, e.g., only a one-dimensional accumulator array), thereby reducing the storage space required. For each value of $\theta$ in a given set of $\theta$ values (ranging between, for example, 0 and 180 degrees), a set of $\rho$ values is computed for each of the (x,y) pixels corresponding to the detected edges. The $\rho$ values are stored in the one-dimensional array, which is then searched for local maxima. If the detected local maxima are greater than those already discovered (for previously analyzed values of $\theta$), the set of local maxima are updated to the newly detected greater values. Each value of $\theta$ is thus analyzed in turn.

In one aspect, a method for detecting a line in an image includes receiving image-space pixel data corresponding to detected edges in the image. A result of a partial conversion of the image-space pixel data to Hough-space data is computed using a local memory. An edge corresponding to a line present in the partial conversion is detected, and the line is compared against other lines detected in previously computed partial conversions to identify a longest line in the image.

In various embodiments, computing the partial conversion includes a linear access of the image-space pixel data. A range of $\theta$ may be divided into a plurality of discrete values within a predetermined range and a value of $\theta$ may be assigned to each partial conversion. Computing the result of the partial conversion may include (i) computing a plurality of $\theta$ values using the image-space pixel data and a predetermined value of $\theta$ and (ii) storing votes corresponding to the $\theta$ values in the local memory. Analyzing the result may include searching for a maximum number of votes stored in the local memory, and the maximum number of votes may be compared against a predetermined threshold. Comparing the line against other lines may include comparing votes for the line against votes for a previously detected line.

Analyzing the result may further include storing the line in a detected-line array; storing the line may include overwriting a previously detected but shorter line. The line may be stored in the detected-line array if the line is not within a noise value of a previously detected line currently stored in the detected-line array; alternatively or in addition, the line may be stored in the detected-line array if the line is (i) within a noise value of a previously detected line currently stored in the detected-line array and (ii) longer than the previously detected line.

In another aspect, a system for detecting lines in an image includes a local memory a processor connected to the local memory via a high-speed interface. The processor is configured to receive image-space pixel data corresponding to detected edges in the image, compute, using the local memory, a result of a partial conversion of the image-space pixel data from image space to Hough space, analyzes the result for an edge corresponding to a line present in the partial conversion, and compare the line against other lines detected in previously computed partial results to identify a longest line in the image.

In various embodiments, the system further includes a main memory, connected to the processor via a slow-speed interface, for storing the image. A size of the image may be greater than a size of the local memory, and the processor may be a digital-signal processor. A camera may generate the image. An input port may receive the image or image-space pixel data from a local storage medium or from a network. The processor may be further configured for detecting edges in the image and for generating the image-space pixel data. The local memory may include a detected-line array for storing the line. Computing the result of the partial conversion may include (i) computing a plurality of $\theta$ values using the image-space pixel data and a predetermined value of $\theta$ and (ii) storing votes corresponding to the $\theta$ values in the local memory. Analyzing the result may include searching for a maximum number of votes stored in the local memory.

In another aspect, a lane-detection system analyzes roadway images received from a vehicle-mounted camera. The system includes a local memory and a processor connected to the local memory via a high-speed interface. The processor receives image-space pixel data from the camera corresponding to detected edges in the roadway image, computes, using the local memory, a result of a partial conversion of the image-space pixel data from image space to Hough space, analyzes the result for an edge corresponding to a line present in the partial conversion, compares the line against other lines detected in previously computed partial results to identify a longest line in the image, and detects the lane based at least in part on the identified longest line. The line may include a lane marker.

In another aspect, the invention pertains to a vehicle equipped with a digital still or video camera and a lane-detection system as described above. The vehicle may include responsive circuitry for warning the driver in the event of drift detected by the lane-detection system, or may include steering control logic for automatically altering the vehicle's course to correct for drift. In still another aspect, the invention relates to a mobile device, such as a "smart phone," equipped with a digital still or video camera and programmed to implement the lane-detection functionality described above. The mobile device may be further programmed to warn the driver, with visual and/or audio cues, when drift is detected.

In another aspect, a method for detecting a line in an image includes (a) receiving image-space pixel data corresponding to detected edges in the image; (b) computing, using a local memory, a result of a partial conversion of the image-space pixel data to Hough-space pixel data; (c) detecting an edge corresponding to a line present in the partial conversion; (d) repeating steps (b) and (c); and (e) comparing a line detected in step (c) against other lines detected in previous iterations of step (c) to identify a longest line in the image.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. In the following, description, various embodiments of the present invention are described with reference to the following drawings, in which.

DETAILED DESCRIPTION

Figure 2:
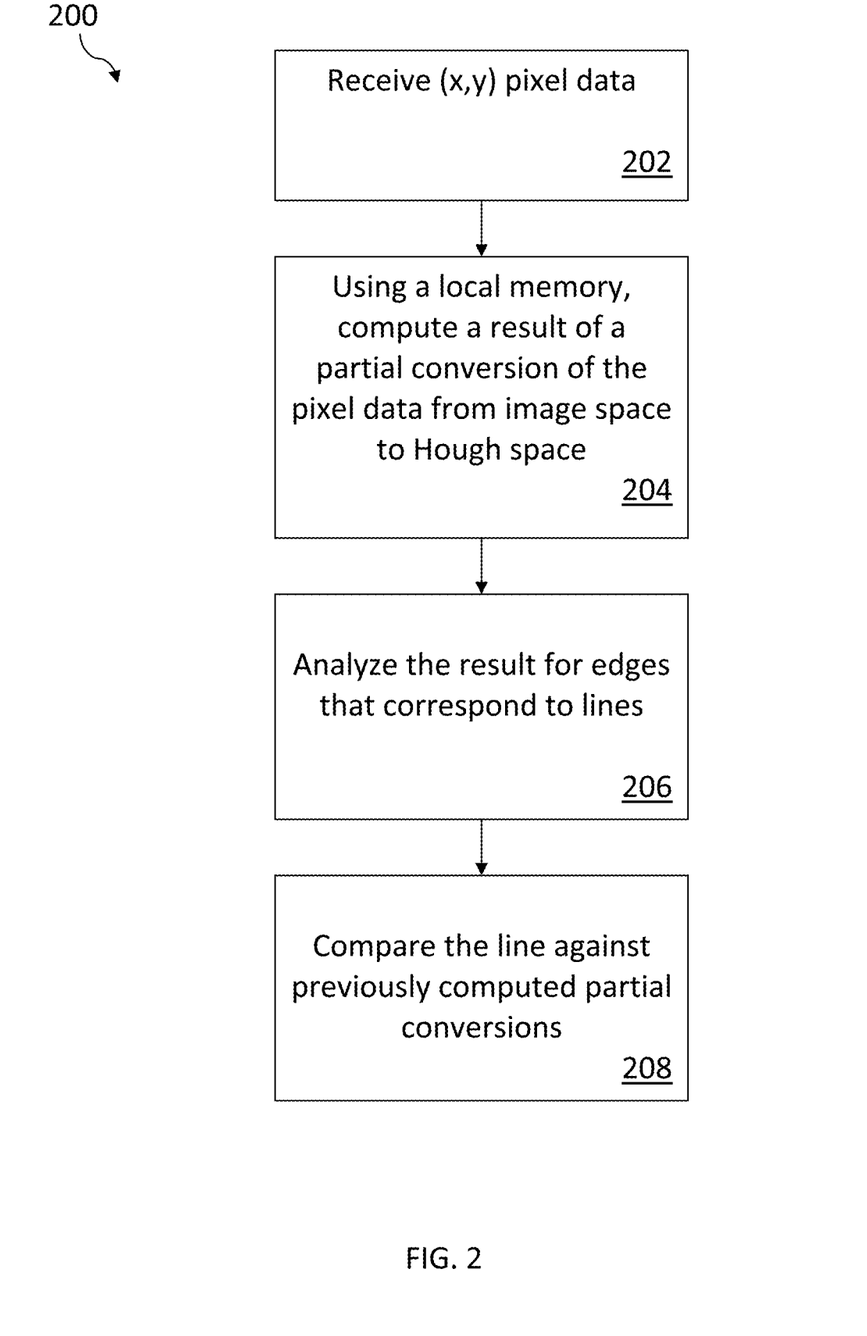
FIG. 2 is a flowchart of a method for detecting lines in an image in accordance with an embodiment of the invention.

A method 200 for detecting lines in an image using a processor having limited local memory is illustrated in FIG.

1. A brief overview of each step in the method 200 is first presented; each step is described in greater detail below. In a first step 202, image-space (x,y) pixel data, corresponding to one or more detected edges in a source image, is received from an input source. The size of the pixel data is such that it cannot be all stored in the local memory at the same time. The data may be stored in a tabular or array format, or as an ordered list, or any other format corresponding to or convertible into a two-dimensional (x,y) arrangement. Any such format qualifies as image-space (x,y) pixel data as that term is used herein.

In a second step 204, the conversion of the (x,y) pixel data from image space to Hough space is partially computed using a local memory. In a third step 206, the result of the partial conversion is analyzed for an edge corresponding to a line present in the partial conversion. In a fourth step 208, the line is compared against other lines detected in previously computed partial results to thereby identify a longest line in the image. As also explained in greater detail below, the second 204, third 206, and fourth 208 steps may be repeated for each value of $\theta$, and the small local memory re-used for each new loop through the steps. As new lines are identified in each loop, they are compared against previously-identified lines and either saved or ignored in accordance with their size and/or other factors.

Returning to the first step 202, in greater detail, the image-space (x,y) pixel data may be received from any appropriate source, such as a camera or other image-acquisition device, local storage medium (e.g., a CD, DVD, hard disk, flash memory, or other such medium), network connection, or computer memory and delivered via an input port. The pixel data may be an edge image in any known format (such as JPEG, GIF, PNG, or BMP) and include a two-dimensional representation of the location of edges in an original image. For example, edges detected in an image may be represented by a darker color than non-edge regions in the image. Alternatively or in addition, the pixel data may include numbers describing (x,y) coordinates of edges in the original image; the (x,y) values may be compressed or uncompressed and may be in any format (e.g., integer, fixed-point, or floating-point). In one embodiment, the (x,y) coordinates for all edge pixels are stored in a linear array. Because the edge pixels are accessed linearly and deterministically (e.g., left-to-right and up-to-down in the image, or in any other order), only a portion of the edge pixels may be read at a time (and stored, e.g., in the local memory); when the local store of edge pixels is nearing exhaustion, a new set of edge pixels may be fetched prior to the time they are needed, thus allowing uninterrupted operation of the method described herein.

The current invention is not limited to any particular representation of the edges detected in the original image, and any method of conveying that information is within the scope of the current invention. The edge-detection function that creates the (x,y) pixel data may run on the same processor or system as the method 200 of the current invention or may run on a separate processor or system. The system that implements the edge-detection function may receive images and/or frames of video directly from a digital camera or other image-acquisition device, or the images may be processed by and/or stored on some other system first.

In the second step 204, the conversion of the (x,y) pixel data from image space to Hough space is partially computed using a local memory. In one embodiment, a single value of $\theta$ is selected from a predetermined set of $\theta$ values; a plurality of $\rho$ values are then computed using equation (2), the received set of (x,y) pixels, and the single value of $\theta$. The rest of the $\theta$ values are used in subsequent loops through the second step 204, but only a single value of $\theta$ is used in each loop to thereby limit the number of $\rho$ values generated and the memory space required to store their accumulated votes. If the size of the local memory permits, $\rho$ values for more than one value of $\theta$ may be computed per loop. In one embodiment, data associated with the computed $\rho$ values (e.g., votes, as explained in greater detail below) are stored in a one-dimensional accumulator array in the local memory.

The range of $\theta$ values may vary from application to application; for example, a system designed to scan images containing unknown shapes may scan $\theta$ from 0 to 180 degrees, while a vehicle-mounted system, in which lines denoting lane markers may be assumed to fall within a known range of angles, may scan $\theta$ from only 0 to 90 degrees or 45 to 135 degrees. The number of $\theta$ values within the range (i.e., the step size of each $\theta$ value) may also be adjusted; more $\theta$ values may produce a more accurate result at the expense of additional processing time. Note, however, that additional $\theta$ values may not require additional local-memory space because each $\theta$ value re-uses the space. In various embodiments, 10, 100, or 1000 $\theta$ values may be used within the determined range.

More specifically, running tallies of votes for a range of $\rho$ values are accumulated in the local memory; each time a new $\rho$ is computed, a corresponding vote count is incremented. In one embodiment, the votes are stored in a one-dimensional accumulator array, but the current invention is not limited to any particular data structure, and any suitable system for storage is within the scope of the current invention. The local memory may be divided into vote bins or buckets corresponding to $\rho$ values between, for example, 0-10, −10-10, −100-100, or 0-100. In one embodiment, the range of bins is dynamically determined by the size of the input image, and the upper limit is determined by the diagonal distance across the image. The step size of $\rho$ between bins may be increased to save memory space or decreased to improve the accuracy of the line detection. In various embodiments, the step size is 0.1, 0.5, 1.0, or 5.0. Each value of $\rho$ may be tallied in the accumulator array as it is computed or several $\rho$ values. In one embodiment, the input image size is 720×480 pixels in size, and the accumulator array requires 3170 bytes of local memory.

In the third step 206, the result of the partial conversion (i.e., the part of the conversion to Hough space corresponding to a single value of $\theta$) is analyzed for edges that correspond to lines present in this part of the conversion process. In one embodiment, the accumulated votes are analyzed for a predetermined number of local maxima. The predetermined number may vary for different applications; a vehicle-mounted system may be configured to search for the two largest maxima, for example, that may correspond to the two lane markers closest to the vehicle. The system may be configured, however, to search for any number (i.e., one or more) of maxima. A threshold value may be specified, and a candidate vote count may qualify as a potential maximum only if it exceeds the threshold. The threshold depends on the application and is straightforwardly identified without undue experimentation. It may, for example, be adjusted downward to detect shorter lines or upward to detect longer lines. In one embodiment, the threshold is adjusted dynamically downward if no lines are found in an image or upward if too many lines are found. If the predetermined number of maxima are already found in a first part of the accumulator array, and a greater maximum is later discovered in a second part of the accumulator array, the greater maximum replaces the already-found maximum having the smallest value. Once the predetermined number of maxima is found, future vote counts may be compared against the smallest value of the already-found maxima instead of the threshold.

Other potential maxima may be discarded if they fall within a noise range of an already-detected maximum. A lane marker may be so thick, for example, that a maximum vote count is detected for the lines that make up both its left edge and its right edge, and a lane-detection system may prefer that only one line be detected for each lane marker. Thus, a noise value may be consulted when a local maximum is detected, and before the detected local maximum is chosen, the (ρ,θ) space within the noise value's distance from the maximum is searched for other, previously detected maxima. If one is found, the currently detected maximum is discarded. In one embodiment, the previously detected maximum is discarded and the current one used, even if the two lines are within a noise value of each other, if the current maximum's vote count is greater. Such a situation may arise when, for example, the captured image includes a passing-lane marker having a dashed line immediately adjacent to a solid line. If a local maximum corresponding to one of the dashes is first detected and saved, it is discarded when the maximum corresponding to the adjacent solid, longer line is detected. Separate noise parameters may be defined for each of ρ and θ, and different noise parameters may be defined for each of the predetermined number of maxima (e.g., the first maximum/line may be configured to use a lower noise tolerance than a second). In one embodiment, the different sets of noise parameters are stored in a data structure along with the number of votes saved for each detected maximum.

In the fourth step 208, the line or lines detected in the partial conversion are compared against other lines detected in previously computed partial results. The other lines may be stored in the local memory and may be placed therein in a data structure such as a detected-line array. A newly detected line may fill an empty slot in the detected-line array, or replace an existing line in the array, if it has a greater number of votes than at least one already-present line and is outside the ρ and/or θ noise parameters of any already-present lines having greater vote counts. Note that, as explained above, the newly detected line may replace an already-present line even if it is inside the noise parameter if the newly detected line has a greater vote count than the already-present line. The detected-value array may include fields for a detected line's number, ρ, θ, and/or vote count.

In one embodiment, the result of the partial conversion is analyzed (as in, e.g., step three 206) and then the analyzed results (e.g., one or more lines as found in step four 208) are compared against previously computed results. In another embodiment, steps three 206 and four 208 are performed in parallel, and each vote count in the accumulator array is compared to entries in the detected-line array at the same time it is compared with its neighbors in the accumulator array. The present invention is not limited to any particular ordering of the steps 202, 204, 206, 208 described herein, and any combination or division of steps, or re-ordering of steps, is within the scope of the current invention.

Figure 3:
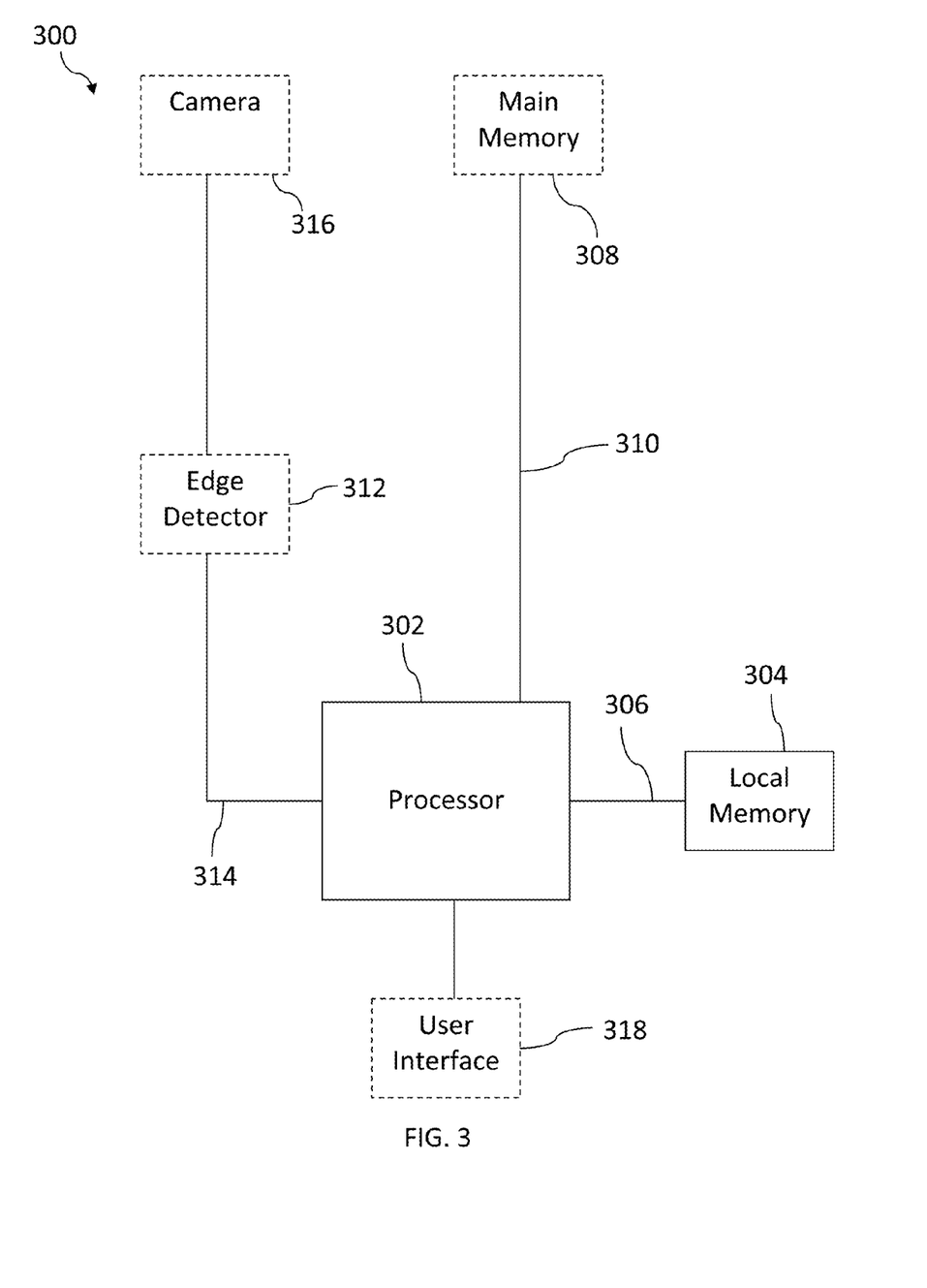
FIG. 3 is a block diagram of a system for detecting lines in an image in accordance with an embodiment of the invention.

A system 300 for detecting lines using a processor 302 having limited local memory 304 is illustrated in FIG. 3. The processor 302 may be a digital-signal processor or a low-power processor. In one embodiment, the local memory 304 is a cache disposed adjacent to the processor 302, as shown in FIG. 3; in another embodiment, the local memory 304 is inside the processor (e.g., L1 memory). Any local memory in a multi-tier memory system is within the scope of the current invention, however, and the current invention is not limited to any particular placement or type of local memory 304.

The local memory 304 is connected via a high-speed link 306 to the processor 302, enabling the processor 302 to read and write the contents of the local memory 304 quickly (in, e.g., one, five, or ten clock cycles). In contrast, a main memory 308 is located remote to the processor 302 and is connected via a low-speed link 310. The main memory 308, which may be an order of magnitude larger than the local memory 304, requires many more clock cycles than the local memory 304 for storage and retrieval of data by the processor 302 (e.g., 100 cycles). Thus, storage of the one-dimensional accumulator and detected-line arrays in the local memory 304, in accordance with the present invention, allows for much faster execution of the Hough transform than otherwise possible at least because the local memory 304 is not large enough to store an entire image and/or a two-dimensional accumulator array. If transfer between the local memory 304 and main memory 308 is desired, direct-memory access may be used to maximize the transfer.

In one embodiment, an edge detector 312 supplies (x,y) pixel data to the processor 302 via an input port 314. The edge detector 312 may be a separate component (or part of a separate component) or may be disposed within the processor 302. The current invention is not limited to any particular placement (or implementation) of the edge detector 312. The edge detector 312 may receive images from a camera 316, such as a vehicle-mounted camera. A user interface 318 may be used to input user commands, parameters, or other data to the processor 302 (such as, for example, the threshold and/or noise parameters discussed above) and may be located locally or remotely (e.g., over a network connection) with respect to the processor 302. The user interface 318 may be used to output data to a user, such as by ringing an alarm or providing a visual alert when the vehicle drifts too close to a lane boundary. In one embodiment, the processor 302 is connected via actuators to the vehicle's steering system and may steer the vehicle away from a too-close lane boundary. In another embodiment, the processor 302 is the central processor of a mobile device, such as a "smart phone," which contains a camera and may be positioned within the vehicle so that the device's on-board camera continually scans the road ahead of the vehicle, while the device's display (and drift warnings provided thereon in response to lane detection) remains easily seen by the user.

Figures 4A, 4B:
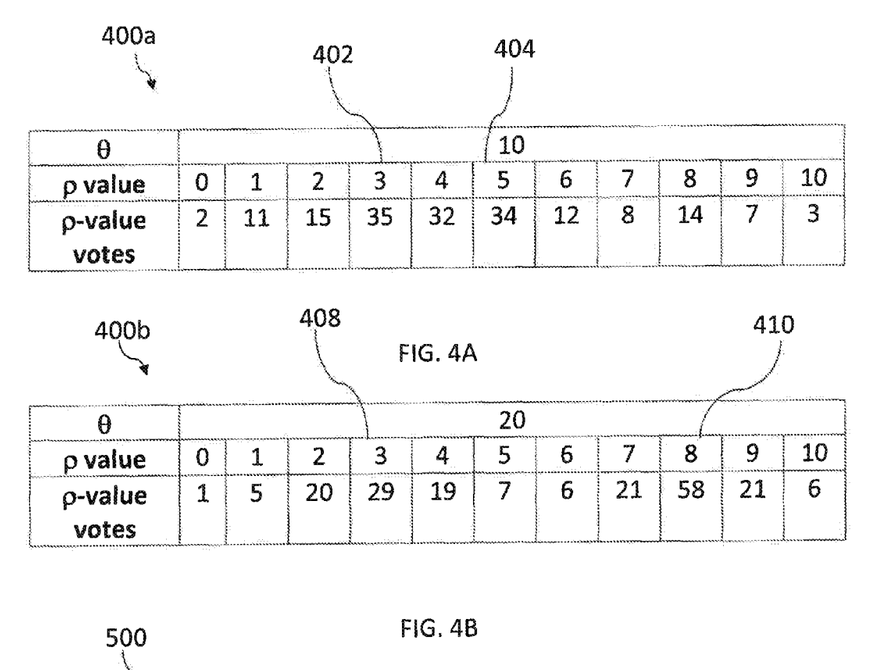
FIGS. 4A-4B are tables representing one-dimensional accumulator arrays in accordance with embodiments of the invention.
Figure 5:
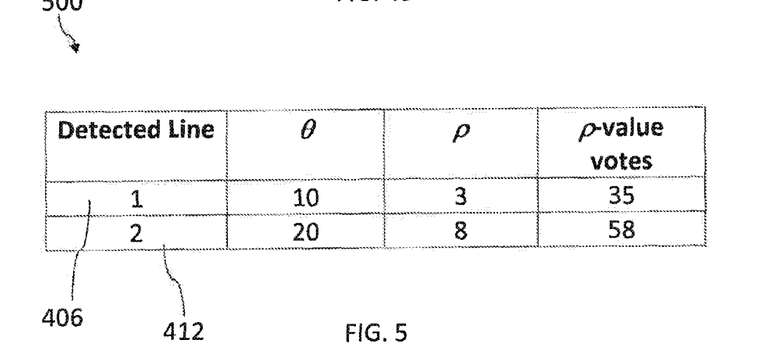
FIG. 5 is a table representing a detected-line array in accordance with an embodiment of the invention.

FIGS. 4A, 4B, and 5 illustrate examples of a one-dimensional accumulator array 400a, 400b and a detected-line array 500, respectively, in accordance with an embodiment of the invention. The sizes of the arrays 400a, 400b, 500 and the values therein are chosen to be exemplary and are not meant to be limiting in any way. FIG. 4A illustrates the result of a partial conversion of (x,y) edge data from image space to Hough space; specifically, ρ votes are accumulated in the array 400a for a given θ value over the (x,y) data. In this example, θ is ten; 35 ρ values were computed that approximately equal three (a first maximum 402) and 34 ρ values were computed that approximately equal five (a second maximum 404). The two maxima 402, 404 may correspond to edges of the same wide line; in this example, therefore, the ρ noise parameter is set to three to avoid this double-detection of the same line. Only the greater of the two maxima 402 is therefore added as the first entry 406 to the detected-line array 500.

FIG. 4B illustrates a partial conversion of the (x,y) data for a new value of θ (namely, twenty). Two maxima are again detected; the first 408 at a ρ value of three (29 votes) and the second 410 at a ρ value of nine (58 votes). In this example, the θ noise parameter is set to five; the first maximum 408, because it is a greater θ distance from the first detected maximum 406 than the magnitude of the θ noise parameter, is therefore added to the empty slot 412 in the detected-line array 500. Once the second maximum 410 is detected, however, because it has a greater vote count (and is outside of the ρ and θ noise parameters with respect to the detected lines) replaces the first maximum 408 in the detected-line array 500 and overwrites the second slot 412.

It should also be noted that embodiments of the present invention may be provided as one or more computer-readable programs embodied on or in one or more articles of manufacture. The article of manufacture may be any suitable hardware apparatus, such as, for example, a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs may be implemented in any programming language. Some examples of languages that may be used include C, C++, or JAVA. The software programs may be further translated into machine language or virtual machine instructions and stored in a program file in that form. The program file may then be stored on or in one or more of the articles of manufacture.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A method for detecting a line in an image with limited local memory space, the method comprising:
   computing, using a local memory, a result of a partial conversion of image-space pixel data to Hough-space data;
   storing the result of the partial conversion in a one-dimensional accumulator array in the local memory, wherein the result comprises vote counts corresponding to ρ values for a predetermined value of θ;
   detecting a line present in the partial conversion by finding a local maximum in the vote counts stored in the one-dimensional accumulator array;
   if the vote count of the local maximum is greater than vote count of the previously found local maximum associated with other lines detected from previously computed results, storing the line by filling an empty slot in a detected-line array with the line, or by replacing one previously detected line having a smallest vote count in the detected-line array; and
   reusing the one dimensional accumulator array in the local memory to compute and analyze further results comprising vote counts corresponding to ρ values for other values of θ.

2. The method of claim 1, wherein computing the result of the partial conversion comprises a linear access of the image-space pixel data.

3. The method of claim 1, further comprising dividing a range of θ into a plurality of discrete values within a predetermined range and assigning a value of θ to each partial conversion.

4. The method of claim 1, wherein:
   computing the result of the partial conversion comprises computing a plurality of ρ values using the image-space pixel data and the predetermined value of θ associated with the partial conversion; and
   storing the result of the partial conversion comprises incrementing vote counts corresponding to the ρ values for the predetermined value of θ in the one-dimensional accumulator array of the local memory.

5. The method of claim 1, further comprising comparing the vote count of the local maximum against a vote count of a previously found local maximum associated with the other lines detected from the previously computed results stored in the detected line array.

6. The method of claim 1, further comprising comparing the vote counts of the one-dimensional array against a predetermined threshold.

7. The method of claim 1, wherein replacing one previously detected line comprises overwriting a previously detected but shorter line.

8. The method of claim 1, wherein the line is stored in the detected-line array if the line is not within a noise value of a previously detected line currently stored in the detected-line array.

9. The method of claim 1, wherein the line is stored in the detected-line array if the line is (i) within a noise value of a previously detected line currently stored in the detected-line array and (ii) is longer than the previously detected line.

10. A system for detecting lines in an image with limited local memory space, the system comprising:
    a local memory; and
    a processor connected to the local memory via a high-speed interface, the processor configured for:
    computing, using the local memory, a result of a partial conversion of image-space pixel data from image space to Hough space;
    storing the result of the partial conversion in a one-dimensional accumulator array in the local memory, wherein the result comprises vote counts corresponding to ρ values for a value of θ;
    analyzing the result for a line present in the partial conversion by finding a local maximum in the vote counts stored in the one-dimensional accumulator array;
    if the vote count of the local maximum is greater than vote count of the previously found local maximum associated with other lines detected from previously computed results, storing the line by filling an empty slot in a detected-line array with the line, or by replacing one previously detected line having a smallest vote count in the detected-line array; and
    computing, analyzing, and storing further results comprising vote counts corresponding to ρ values for other values of θ using the same one dimensional accumulator array in the local memory.

11. The system of claim 10, further comprising a main memory for storing the image-space pixel data, the main memory being connected to the processor via a slow-speed interface.

12. The system of claim 10, wherein a size of the image-space pixel data is greater than a size of the local memory.

13. The system of claim 10, wherein the processor is a digital signal processor or a low-power processor.

14. The system of claim 10, further comprising a camera for generating the image-space pixel data.

15. The system of claim 10, further comprising an input port for receiving the image-space pixel data from a local storage medium or from a network.

16. The system of claim 10, wherein the processor is further configured for comparing the vote counts of one-dimensional array against a predetermined threshold before a candidate vote count qualifies as a potential local maximum.

17. The system of claim 10, wherein the local memory comprises the detected-line array for storing the line.

18. The system of claim 10, wherein:
the local memory is inside the processor.

19. The system of claim 10, wherein storing the line comprises storing the line in the detected-line array if the line is (i) within a noise value of a previously detected line currently stored in the detected-line array and (ii) is longer than the previously detected line.

20. A lane-detection system with limited local memory space for analyzing roadway images received from a vehicle-mounted camera, the lane-detection system comprising:
a local memory; and
a processor connected to the local memory via a high-speed interface, the processor configured for:
receiving image-space pixel data from the camera corresponding to detected edges in the roadway image;
computing, using the local memory, a result of a partial conversion of the image-space pixel data from image space to Hough space, wherein the result comprises vote counts corresponding to $\rho$ values for a value of $\theta$;
storing the result of the partial conversion in a one-dimensional accumulator array in the local memory;
analyzing the result for an edge corresponding to a line present in the partial conversion by finding a local maximum in the vote counts stored in the one-dimensional accumulator array;
if the vote count of the local maximum is greater than vote count of the previously found local maximum associated with other lines detected from previously computed results, storing the line by filling an empty slot in a detected-line array with the line, or by replacing one previously detected line having a smallest vote count in the detected-line array;
reusing the one dimensional accumulator array in the local memory to compute and analyze further results comprising vote counts corresponding to $\rho$ values for other values of $\theta$; and
detecting a lane based on the identified longest line in the detected line array.

21. The lane-detection system of claim 20, wherein the line comprises a lane marker.

22. The method of claim 8, wherein the noise value corresponds to a noise parameter defined for $\rho$.

23. The method of claim 8, wherein the noise value corresponds to a noise parameter defined for $\theta$.

* * * * *